United States Patent
Han et al.

(10) Patent No.: US 11,386,795 B2
(45) Date of Patent: Jul. 12, 2022

(54) AERIAL VEHICLE IDENTIFICATION

(71) Applicant: Lenovo (Beijing) Limited, Beijing (CN)

(72) Inventors: Jing Han, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 219 days.

(21) Appl. No.: 16/638,417

(22) PCT Filed: Aug. 11, 2017

(86) PCT No.: PCT/CN2017/097254
§ 371 (c)(1),
(2) Date: Feb. 11, 2020

(87) PCT Pub. No.: WO2019/028902
PCT Pub. Date: Feb. 14, 2019

(65) Prior Publication Data
US 2020/0219408 A1 Jul. 9, 2020

(51) Int. Cl.
*G08G 5/00* (2006.01)
*G05D 1/00* (2006.01)
(Continued)

(52) U.S. Cl.
CPC ......... *G08G 5/0082* (2013.01); *B64C 39/024* (2013.01); *G05D 1/10* (2013.01);
(Continued)

(58) Field of Classification Search
CPC .... G08G 5/0082; G08G 5/0013; G08G 5/006; G08G 5/0069; G08G 5/00; B64C 39/024;
(Continued)

(56) References Cited

U.S. PATENT DOCUMENTS 9,691,285 B2 6/2017 Jarrell
10,310,498 B2 * 6/2019 Petruzzelli ........... G05D 1/0011
(Continued)

FOREIGN PATENT DOCUMENTS

CN 105739520 A 7/2016
CN 105759834 A 7/2016
(Continued)

OTHER PUBLICATIONS

International Application No. PCT/CN2017/097254, Notification of Transmittal of the International Search Report and the Written Opinion of the International Searching Authority, dated Apr. 28, 2018, pp. 1-9.
(Continued)

*Primary Examiner* — Yonel Beaulieu
(74) *Attorney, Agent, or Firm* — Kunzler Bean & Adamson (57) ABSTRACT

Apparatuses, methods, and systems are disclosed for aerial vehicle identification. One apparatus (300) includes a transmitter (310) that transmits (502) a request for information to a remote unit (102), wherein the information aids in identifying an unauthorized aerial vehicle. The apparatus (300) includes a receiver (312) that receives (504) a response to the request for information from the remote unit (102). The apparatus (300) includes a processor (302) that determines (506), based on the information, whether the remote unit (102) is part of an unauthorized aerial vehicle. In response to determining that the remote unit (102) is part of an unauthorized aerial vehicle, the transmitter (310) transmits (508) an indication to a base unit indicating that the remote unit is part of an unauthorized aerial vehicle.

18 Claims, 6 Drawing Sheets

(51) Int. Cl.
*G05D 1/10* (2006.01)
*G06F 21/44* (2013.01)
*H04W 4/00* (2018.01)
*H04W 4/12* (2009.01)
*B64C 39/02* (2006.01)

(52) U.S. Cl.
CPC ............. *G06F 21/44* (2013.01); *G08G 5/006* (2013.01); *G08G 5/0013* (2013.01); *H04W 4/12* (2013.01)

(58) Field of Classification Search
CPC .. B64C 39/02; G05D 1/10; G05D 1/00; G06F 21/44; H04W 4/12; H04W 12/08; H04W 12/122; H04W 4/00
See application file for complete search history.

(56) References Cited

U.S. PATENT DOCUMENTS

| | | | | |
|---|---|---|---|---|
| 2016/0225264 | A1* | 8/2016 | Taveira | G08G 5/0013 |
| 2017/0328683 | A1* | 11/2017 | Smith | F41G 7/346 |
| 2018/0068567 | A1* | 3/2018 | Gong | G08G 5/0069 |
| 2018/0157255 | A1* | 6/2018 | Halverson | B64C 39/024 |
| 2018/0324662 | A1* | 11/2018 | Phuyal | H04B 7/15507 |
| 2019/0061942 | A1* | 2/2019 | Miller | G08G 5/006 |
| 2019/0212724 | A1* | 7/2019 | Phuyal | H04B 7/18506 |
| 2019/0310628 | A1* | 10/2019 | Taveira | G08G 5/0013 |
| 2020/0260259 | A1* | 8/2020 | Zhang | H04B 7/18506 |
| 2021/0092604 | A1* | 3/2021 | Fox | H04K 3/45 |
| 2021/0099870 | A1* | 4/2021 | Moon | H04W 60/00 |
| 2021/0259045 | A1* | 8/2021 | Prabhakar | G08G 5/0052 |
| 2021/0343152 | A1* | 11/2021 | Faccin | G08G 5/006 |

FOREIGN PATENT DOCUMENTS

| | | |
|---|---|---|
| WO | 2016154949 A1 | 10/2016 |
| WO | 2017059394 A1 | 4/2017 |

OTHER PUBLICATIONS

Qualcomm Incorporated, "Identification of Aerial Vehicles", 3GPP TSG-RAN WG2 Meeting #98, R2-1704156, May 15-19, 2017, pp. 1-5.

Ericsson, "Identify certification for drones", 3GPP TSG-RAN WG2 Meeting #98 R2-1705428, May 15-19, 2017, pp. 1-2.

NTT Docomo Inc., et al., "New SID on Enhanced Support for Aerial Vehicles", 3GPP TSG RAN Meeting #75 RP-170779, Mar. 6-9, 2017, pp. 1-4.

Nokia et al., "Non-certified air-borne UE detection", 3GPP TSG-RAN WG2 Meeting #98 R2-1704320, May 15-19, 2017, pp. 1-3.

* cited by examiner

AERIAL VEHICLE IDENTIFICATION

FIELD

The subject matter disclosed herein relates generally to wireless communications and more particularly relates to aerial vehicle identification.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, aerial vehicles may cause cellular network interference. In such networks, the aerial vehicles may be unauthorized.

BRIEF SUMMARY

Apparatuses for aerial vehicle identification are disclosed. Methods and systems also perform the functions of the apparatus. In one embodiment, the apparatus includes a transmitter that transmits a request for information to a remote unit, wherein the information aids in identifying an unauthorized aerial vehicle. In certain embodiments, the apparatus includes a receiver that receives a response to the request for information from the remote unit. In various embodiments, the apparatus includes a processor that determines, based on the information, whether the remote unit is part of an unauthorized aerial vehicle. In some embodiments, in response to determining that the remote unit is part of an unauthorized aerial vehicle, the transmitter transmits an indication to a base unit indicating that the remote unit is part of an unauthorized aerial vehicle.

In one embodiment, the transmitter transmits the request for information to the remote unit in response to a message received from the remote unit, the base unit, or some combination thereof. In a further embodiment, the message is received from the remote unit in response to the remote unit requesting access to a cellular network. In certain embodiments, the transmitter transmits the request for information to the remote unit in response to a message received by the base unit, and the message includes a request to identify whether the remote unit is part of an unauthorized aerial vehicle.

In various embodiments, the request to identify whether the remote unit is part of an unauthorized aerial vehicle includes a remote unit identification, a list of remote unit identifications, a serving cell identification of the remote unit, a message type, or some combination thereof. In some embodiments, the request to identify whether the remote unit is part of an unauthorized aerial vehicle is transmitted from the base unit in response to a predetermined condition occurring. In one embodiment, the predetermined condition includes the base unit detecting strong interference in a cellular network comprising the remote unit, the remote unit requesting access to the cellular network, or some combination thereof. In a further embodiment, the processor determines whether the remote unit is part of an unauthorized aerial vehicle by accessing a location server, a network server, an aerial server, a drone server, or some combination thereof. In certain embodiments, the information includes location information, assistance information, quality of service information, or some combination thereof.

In various embodiments, the location information includes a longitude, a latitude, an altitude, a velocity, a direction, an accuracy, a confidence, or some combination thereof. In some embodiments, the assistance information includes a service type, a flight path plan, a certification, an authentication, or some combination thereof. In one embodiment, the processor determines, based on the information, whether the remote unit is part of an unauthorized aerial vehicle by using a three dimensional geographical map to determine whether the remote unit is airborne, using certification information to determine whether a flying remote unit is authorized, or some combination thereof. In a further embodiment, the processor determines, based on the information, whether the remote unit is part of an unauthorized aerial vehicle by: in response to the remote unit having no drone capability, no certification, and being in the air, determining that the remote unit is an unauthorized aerial vehicle; in response to the remote unit having drone capability, no certification, and being in the air, determining that the remote unit is an unauthorized aerial vehicle; and in response to the remote unit having drone capability, a certification, and being in the air, determining that the remote unit is an authorized aerial vehicle.

In certain embodiments, the transmitter transmits the indication to the base unit indicating that the remote unit is part of an unauthorized aerial vehicle by transmitting a time period after which the remote unit will be unauthorized in the cellular network, a remote unit identification that is part of an unauthorized aerial vehicle, a list of remote unit identifications that are part of an unauthorized aerial vehicle, a remote unit type that is part of an unauthorized aerial vehicle, or some combination thereof. In various embodiments, in response to transmitting an indication to the base unit indicating that the remote unit is part of an unauthorized aerial vehicle, the base unit sends a radio resource control release message to the remote unit. In some embodiments, the radio resource control release message includes a timer that indicates a time during which the remote unit cannot access the cellular network and a cause indicator that indicates a reason for the radio resource control release message. In one embodiment, in response to transmitting an indication to the base unit indicating that the remote unit is part of an unauthorized aerial vehicle, the base unit handles the remote unit based on predetermined rules.

In certain embodiments, the base unit handles the remote unit by limiting the behavior of the remote unit. In various embodiments, the base unit handles the remote unit by limiting a flying area of the remote unit. In some embodiments, the base unit handles the remote unit by blacklisting the remote unit from service after the remote unit lands in a specified area. In one embodiment, the base unit handles the remote unit by increasing a difficulty of the remote unit accessing the cellular network.

A method for aerial vehicle identification, in one embodiment, includes transmitting a request for information to a remote unit, wherein the information aids in identifying an unauthorized aerial vehicle. In some embodiments, the method includes receiving a response to the request for information from the remote unit. In certain embodiments, the method includes determining, based on the information, whether the remote unit is part of an unauthorized aerial vehicle. In various embodiments, the method includes, in response to determining that the remote unit is part of an unauthorized aerial vehicle, transmitting an indication to a base unit indicating that the remote unit is part of an unauthorized aerial vehicle.

In one embodiment, an apparatus for aerial vehicle identification includes a receiver that receives an indication indicating that a remote unit is part of an unauthorized aerial vehicle, wherein the indication is received in response to a determination that the remote unit is part of an unauthorized aerial vehicle. In certain embodiments, the apparatus includes a processor that, in response to receiving the indication, handles the remote unit based on predetermined rules.

In one embodiment, the apparatus includes a transmitter that transmits a request to identify whether the remote unit is part of an unauthorized aerial vehicle in response to a predetermined condition occurring. In a further embodiment, the predetermined condition includes detecting strong interference in a cellular network comprising the remote unit, the remote unit requesting access to the cellular network, or some combination thereof. In certain embodiments, the receiver receives the indication indicating that the remote unit is part of an unauthorized aerial vehicle by receiving a time period after which the remote unit will be unauthorized in the cellular network, a remote unit identification that is part of an unauthorized aerial vehicle, a list of remote unit identifications that are part of an unauthorized aerial vehicle, a remote unit type that is part of an unauthorized aerial vehicle, or some combination thereof. In various embodiments, the apparatus includes a transmitter, and, in response to receiving an indication that the remote unit is part of an unauthorized aerial vehicle, the transmitter transmits a radio resource control release message to the remote unit. In some embodiments, the radio resource control release message includes a timer that indicates a time during which the remote unit cannot access the cellular network and a cause indicator that indicates a reason for the radio resource control release message. In one embodiment, the processor, in response to receiving an indication indicating that the remote unit is part of an unauthorized aerial vehicle, handles the remote unit based on predetermined rules.

In a further embodiment, the processor handles the remote unit by limiting the behavior of the remote unit. In certain embodiments, the processor handles the remote unit by limiting a flying area of the remote unit. In various embodiments, the processor handles the remote unit by blacklisting the remote unit from service after the remote unit lands in a specified area. In some embodiments, the processor handles the remote unit by increasing a difficulty of the remote unit accessing the cellular network.

A method for aerial vehicle identification, in one embodiment, includes receiving an indication indicating that a remote unit is part of an unauthorized aerial vehicle, wherein the indication is received in response to a determination that the remote unit is part of an unauthorized aerial vehicle. The method, in certain embodiments, includes, in response to receiving the indication, handling the remote unit based on predetermined rules.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
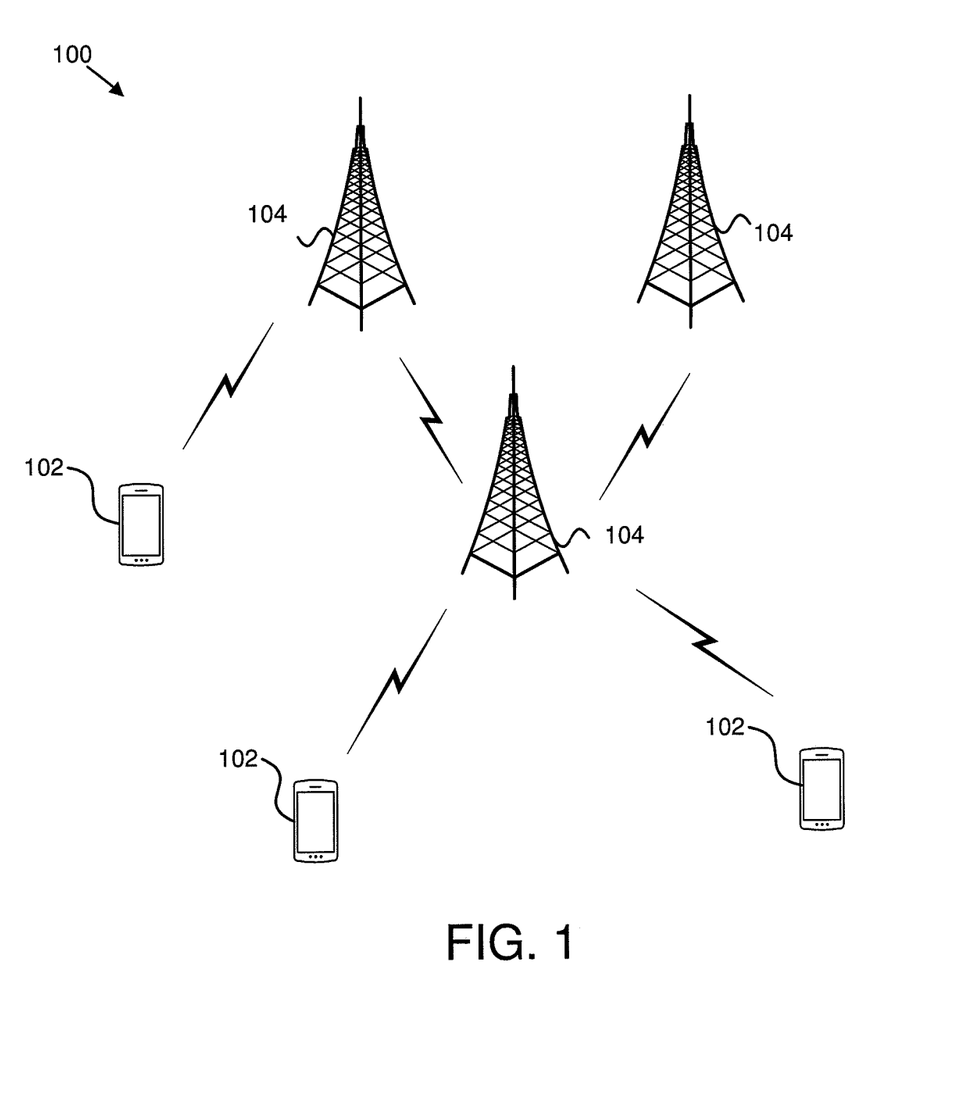
FIG. 1 is a schematic block diagram illustrating one embodiment of a wireless communication system for aerial vehicle identification.

FIG. 1 depicts an embodiment of a wireless communication system 100 for aerial vehicle identification. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 (e.g., aerial server, eNB) may transmit a request for information to a remote unit 102, wherein the information aids in identifying an unauthorized aerial vehicle. In some embodiments, the base unit 104 may receive a response to the request for information from the remote unit 102. In certain embodiments, the base unit 104 may determine, based on the information, whether the remote unit 102 is part of an unauthorized aerial vehicle. In various embodiments, the base unit 104 may, in response to determining that the remote unit 102 is part of an unauthorized aerial vehicle, transmit an indication to another base unit 102 (e.g., eNB) indicating that the remote unit is part of an unauthorized aerial vehicle. Accordingly, a base unit 104 may be used for aerial vehicle identification.

In one embodiment, a base unit 104 (e.g., eNB) may receive an indication indicating that a remote unit 102 is part of an unauthorized aerial vehicle, wherein the indication is received in response to a determination that the remote unit 102 is part of an unauthorized aerial vehicle. The base unit 104, in certain embodiments, may, in response to receiving the indication, handle the remote unit 102 based on predetermined rules. Accordingly, a base unit 104 may be used for aerial vehicle identification.

Figure 2:
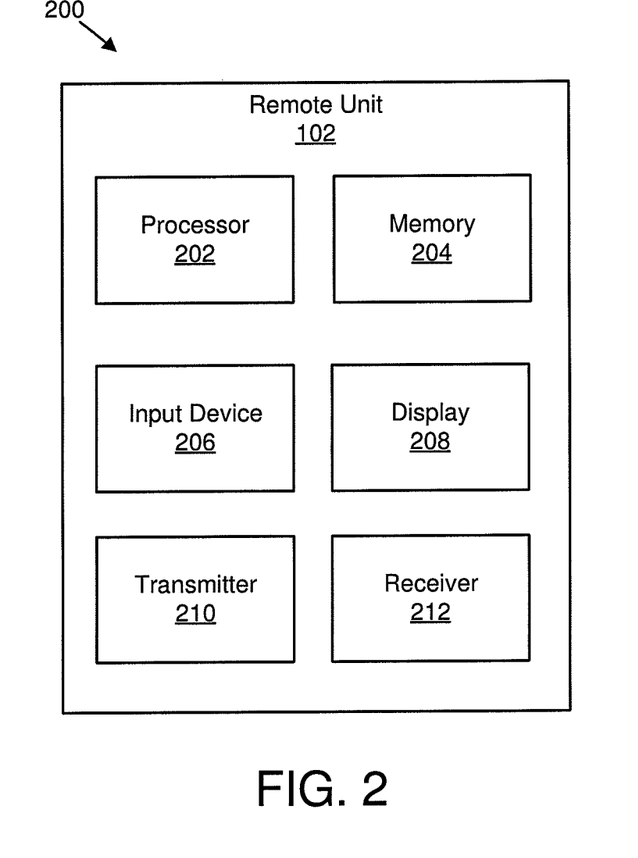
FIG. 2 is a schematic block diagram illustrating one embodiment of an apparatus that may be used for aerial vehicle identification.

FIG. 2 depicts one embodiment of an apparatus 200 that may be used for aerial vehicle identification. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 may be used to receive a request for information to aid in identifying an unauthorized aerial vehicle. In various embodiments, the transmitter 210 may be used to transmit a response to the request for information. In certain embodiments, the receiver 212 may receive a radio resource control release message, may receive information limiting the behavior of the remote unit 102, may receive information limiting a flying area of the remote unit 102, may receive information blacklisting the remote unit 102 from service after the remote unit 102 lands in a specified area, may receive information increasing a difficulty of the remote unit 102 accessing the cellular network. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
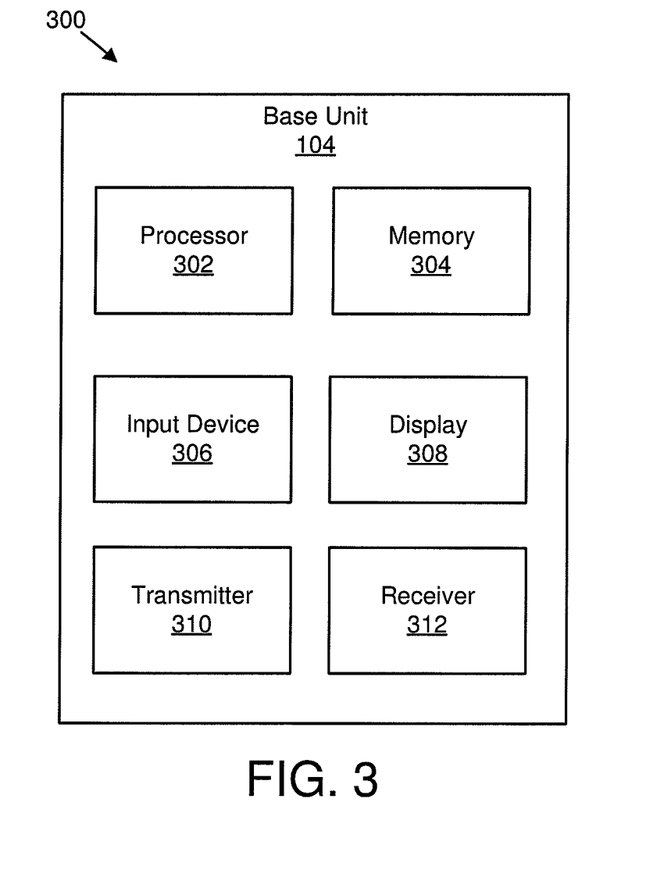
FIG. 3 is a schematic block diagram illustrating one embodiment of an apparatus that may be used for aerial vehicle identification.

FIG. 3 depicts one embodiment of an apparatus 300 that may be used for aerial vehicle identification. The apparatus 300 includes one embodiment of the base unit 104 and/or an aerial server. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit a request for information to a remote unit 102, wherein the information aids in identifying an unauthorized aerial vehicle. In various embodiments, the receiver 312 may receive a response to the request for information from the remote unit 102. In certain embodiments, the processor 302 may determine, based on the information, whether the remote unit 102 is part of an unauthorized aerial vehicle. In one embodiment, in response to determining that the remote unit 102 is part of an unauthorized aerial vehicle, the transmitter 310 may transmit an indication to a base unit 104 indicating that the remote unit is part of an unauthorized aerial vehicle.

In some embodiments, the receiver 312 may receive an indication indicating that a remote unit 102 is part of an unauthorized aerial vehicle, wherein the indication is received in response to a determination that the remote unit 102 is part of an unauthorized aerial vehicle. In certain embodiments, the processor 302 may, in response to receiving the indication, handle the remote unit 102 based on predetermined rules. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
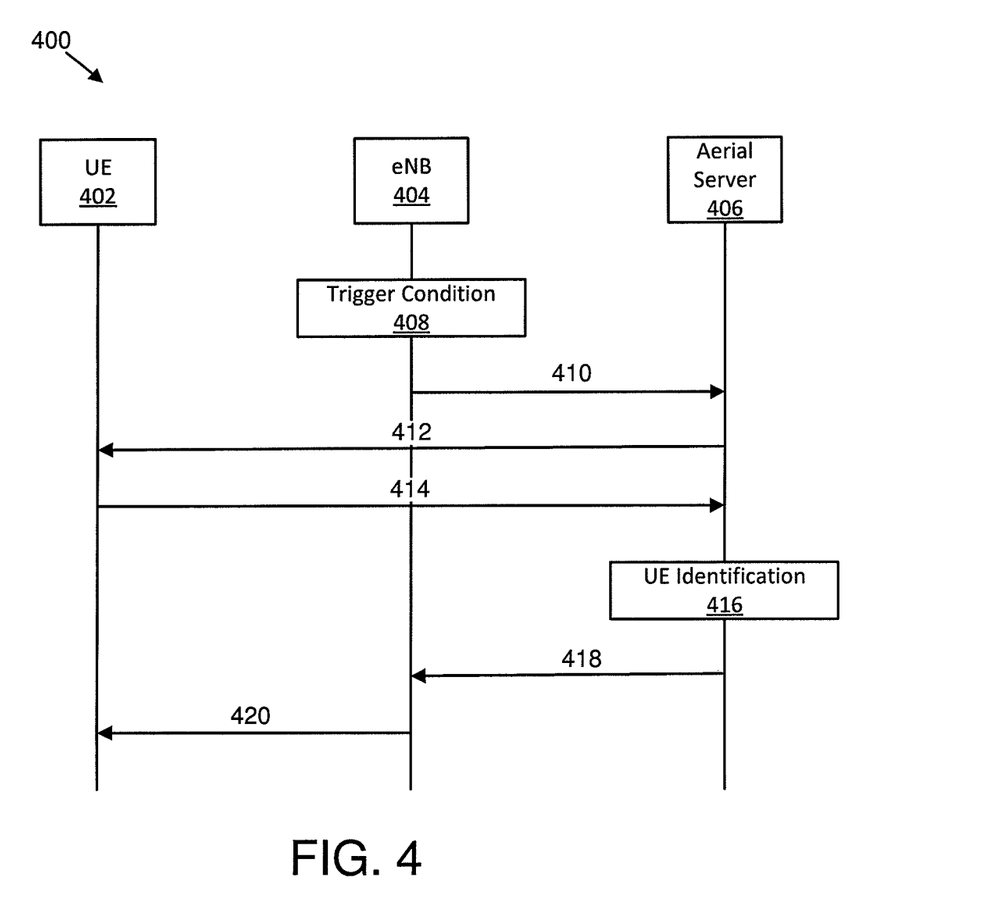
FIG. 4 is a schematic block diagram illustrating one embodiment of aerial vehicle identification.

FIG. 4 is a schematic block diagram illustrating one embodiment of aerial vehicle identification. Communications 400 between a UE 402, an eNB 404, and an aerial server 406 are illustrated.

In certain embodiments, the eNB 404 may detect a trigger condition 408 that may trigger determining whether the UE 402 is part of an unauthorized aerial vehicle. In some embodiments, the trigger condition 408 may include the eNB 404 detecting strong interference in a cellular network that includes the UE 402 as part of an aerial vehicle. In various embodiments, the trigger condition 408 may include the UE 402 (e.g., as part of an aerial vehicle) requesting access to a cellular network. In certain embodiments, the trigger condition 408 may be any event that may indicate that the UE 402 is part of an unauthorized aerial vehicle.

In a first communication 410, the eNB 404 may transmit a message to the aerial server 406 to request an identify of the UE 402. In some embodiments, the first communication 410 may be unused because the aerial server 406 may detect that it needs to determine whether the UE 402 is authorized to be part of an aerial vehicle. In certain embodiments, the first communication 410 may be transmitted via a location positioning protocol ("LPP") interface (e.g., via LPP signaling), an S1 interface, a new interface between the eNB 404 and the aerial server 406, and/or an internal message in the eNB 404. In various embodiments, the first communication 410 may indicate a variety of information. For example, the message may indicate a UE identification for the request, a list of UE identifications for the request, a cell network identification, and/or a message type.

As used herein, the aerial server 406 may be any suitable type of server. In one embodiment, the aerial server 406 may be part of a location server. In another embodiment, the aerial server 406 may be a server separate from the location server and specifically used for aerial vehicles. In such embodiments, the aerial server 406 may reside in a core network, be part of a radio access network, and/or be part of the eNB 404. In some embodiments, the aerial server 406 may be configured to operate specifically with aerial vehicles. For example, the aerial server 406 may be configured to identify unauthorized UEs that are part of aerial vehicles, analyze a flight plan of an aerial vehicle, process a flight plan of an aerial vehicle, analyze an aerial vehicle flying area, and/or process an aerial vehicle flying area.

In a second communication 412, the aerial server 406 may transmit a request for information to the UE 402 or to a list of UEs provided by the eNB 404. In some embodiments, the request for information may be a request for the UE 402 (or UEs) to report location information and/or assistant information. In certain embodiments, the second communication 412 may indicate a type of location information, a type of assistant information, and/or a quality of service (such as a quality of service associated with the location information and/or the assistant information). In various embodiments, the second communication 412 may be transmitted in response to the first communication 410. In some embodiments, the second communication 412 may be transmitted in response to the UE 402 having initial access indicating that the UE 402 is part of an aerial vehicle. In certain embodiments, the type of location information may include a longitude, a latitude, an altitude, a velocity, a direction, an accuracy (e.g., associated with another type of location information) and/or a confidence requirement. In various embodiments, the type of assistant information may include a service type, a flight path plan, a certification, and/or an authentication.

In a third communication 414, the UE 402 may transmit a response to the aerial server 406 in response to the request from the aerial server 406. The UE 402 may use the response to report location information and/or assistant information requested by the aerial server 406. In some embodiments, the location information may include a longitude, a latitude, an altitude, a velocity, a direction, an accuracy (e.g., associated with another type of location information), and/or a confidence requirement. In various embodiments, the assistant information may include a service type, a flight path plan, a certification, and/or an authentication.

UE identification 416 may be performed by the aerial server 406 to identify whether the UE 402 as part of an aerial vehicle is authorized. In certain embodiments, UE identification 416 may be performed based on location information and/or assistant information. In some embodiments, the aerial server 406 may use a three dimensional ("3D") geographical map to identify whether the UE 402 is airborne or on the ground. For example, based on 3D topography, the aerial server 406 may be able to determine how high off the ground the UE 402 is. In one embodiment, in response to the UE 402 being a predetermined height above the ground, the UE 402 may be determined to be airborne. In one example, the predetermined height may be 6 feet. In some embodiments, in response to the UE 402 being below the predetermined height, the UE 402 may be determined to be on the ground. In certain embodiments, the aerial server 406 may use the UE's certification information (e.g., obtained from a certification authority or third party), authentication information, and/or flying certification information (e.g., obtained from a certification authority or third party) to identify whether an airborne UE is authorized to be airborne. In various embodiments, the aerial server 406 may determine whether an airborne UE is in an allowed flying area (e.g., by comparing the location of the UE 402 to allowed or disallowed flying areas). In some embodiments, with the UE identification 416, the aerial server 406 may identified that: if the UE 402 has no aerial vehicle capability, no certification, and is in the air, then the UE 402 is an unauthorized non-aerial vehicle UE that is flying; and if the UE 402 has aerial vehicle capability, no certification, and is in the air, then the UE 402 is an unauthorized aerial vehicle UE that is flying.

In a fourth communication 418, the aerial server 406 may send a message to the eNB 404 to indicate an unauthorized UE identification and/or an unauthorized UE identification list. In some embodiments, the message may include a time period that upon expiration indicates that the UE 402 is unauthorized.

In a fifth communication 420, the eNB 404 may transmit an RRC release message to the UE 402 in response to the UE 402 being unauthorized. In certain embodiments, the eNB 404 may handle the UE 402 according to predetermined (e.g., preconfigured) rules in response to the UE 402 being unauthorized. In some embodiments, the fifth communication 420 may include a prohibit timer and/or a cause value. In such embodiments, the prohibit timer may be used by the eNB 404 to indicate to an unauthorized UE how much time it cannot access a cellular network. In various embodiments, a cause value may be used by the eNB 404 to indicate to an unauthorized UE a release reason (e.g., unauthorized flight altitude, unauthorized flight path, unauthorized flight area, etc.).

In certain embodiments, the eNB 404 may handle an unauthorized UE by using one or more of the following rules to limit the control or behavior of the unauthorized UE: only a subset of control may be used by unauthorized UEs (e.g., only hover commands, only decent commands, only back to initial position commands that direct a UE to return by the way it came, etc.).

In some embodiments, two operation modes may be designed for the UE 402: full operation mode ("FOM") and restricted operation mode ("ROM"). In various embodiments, in response to an aerial vehicle being authorized to fly, then FOM may be used; otherwise, in response to an aerial vehicle being unauthorized to fly, the UE 402 may be controlled (e.g., via a command from a cellular network) to switch from the FOM to the ROM. In certain embodiments, ROM may mean that only part of available commands for the UE 402 and/or the aerial vehicle carrying the UE 402 may be used. In various embodiments, ROM may be used to: limit a flying area such that an unauthorized UE may only attach to a current base unit or several base units in a specific area; identify a list of possible base units for an unauthorized UE—such as a current base unit, an experienced base unit, and any other base units (e.g. a base unit with has fewer UEs attached to avoid collision, base units which have fewer ground objects to avoid risk, etc.); only allow the UE 402 to access a base station list; blacklist the UE 402 from further service after landing in a specific area; modify a baring parameter that bars the UE 402 from accessing a cellular network; and/or introduce a prohibit timer that bars the UE 402 from accessing a cellular network until the timer expires so that it may decrease the ability of the UE 402 for accessing the cellular network.

Figure 5:
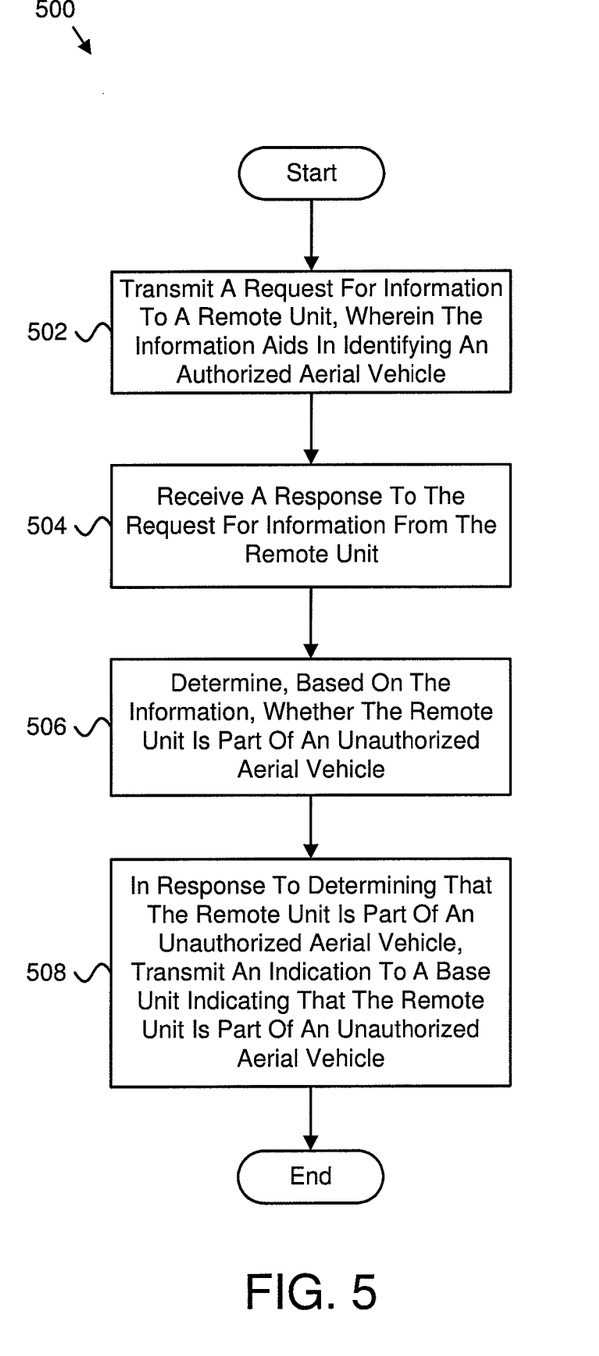
FIG. 5 is a schematic flow chart diagram illustrating one embodiment of a method for aerial vehicle identification.

FIG. 5 is a schematic flow chart diagram illustrating one embodiment of a method 500 for aerial vehicle identification. In some embodiments, the method 500 is performed by an apparatus, such as the base unit 104 (e.g., aerial server). In certain embodiments, the method 500 may be performed by a processor executing program code, for example, a microcontroller, a microprocessor, a CPU, a GPU, an auxiliary processing unit, a FPGA, or the like.

The method 500 may include transmitting 502 a request for information to a remote unit, wherein the information aids in identifying an unauthorized aerial vehicle. In some embodiments, the method 500 includes receiving 504 a response to the request for information from the remote unit. In certain embodiments, the method 500 includes determining 506, based on the information, whether the remote unit is part of an unauthorized aerial vehicle. In various embodiments, the method 500 includes, in response to determining that the remote unit is part of an unauthorized aerial vehicle, transmitting 508 an indication to a base unit indicating that the remote unit is part of an unauthorized aerial vehicle.

In one embodiment, the method 500 includes transmitting the request for information to the remote unit in response to a message received from the remote unit, the base unit, or some combination thereof. In a further embodiment, the message is received from the remote unit in response to the remote unit requesting access to a cellular network. In certain embodiments, the method 500 includes transmitting the request for information to the remote unit in response to a message received by the base unit, and the message includes a request to identify whether the remote unit is part of an unauthorized aerial vehicle.

In various embodiments, the request to identify whether the remote unit is part of an unauthorized aerial vehicle includes a remote unit identification, a list of remote unit identifications, a serving cell identification of the remote unit, a message type, or some combination thereof. In some embodiments, the request to identify whether the remote unit is part of an unauthorized aerial vehicle is transmitted from the base unit in response to a predetermined condition occurring. In one embodiment, the predetermined condition includes the base unit detecting strong interference in a cellular network comprising the remote unit, the remote unit requesting access to the cellular network, or some combination thereof. In a further 30o embodiment, determining whether the remote unit is part of an unauthorized aerial vehicle includes accessing a location server, a network server, an aerial server, a drone server, or some combination thereof. In certain embodiments, the information includes location information, assistance information, quality of service information, or some combination thereof.

In various embodiments, the location information includes a longitude, a latitude, an altitude, a velocity, a direction, an accuracy, a confidence, or some combination thereof. In some embodiments, the assistance information includes a service type, a flight path plan, a certification, an authentication, or some combination thereof. In one embodiment, the method 600 includes determining, based on the information, whether the remote unit is part of an unauthorized aerial vehicle by using a three dimensional geographical map to determine whether the remote unit is airborne, using certification information to determine whether a flying remote unit is authorized, or some combination thereof. In a further embodiment, the method 600 includes determining determines, based on the information, whether the remote unit is part of an unauthorized aerial vehicle by: in response to the remote unit having no drone capability, no certification, and being in the air, determining that the remote unit is an unauthorized aerial vehicle; in response to the remote unit having drone capability, no certification, and being in the air, determining that the remote unit is an unauthorized aerial vehicle; and in response to the remote unit having drone capability, a certification, and being in the air, determining that the remote unit is an authorized aerial vehicle.

In certain embodiments, the method 500 includes transmitting the indication to the base unit indicating that the remote unit is part of an unauthorized aerial vehicle by transmitting a time period after which the remote unit will be unauthorized in the cellular network, a remote unit identification that is part of an unauthorized aerial vehicle, a list of remote unit identifications that are part of an unauthorized aerial vehicle, a remote unit type that is part of an unauthorized aerial vehicle, or some combination thereof. In various embodiments, in response to transmitting an indication to the base unit indicating that the remote unit is part of an unauthorized aerial vehicle, the base unit sends a radio resource control release message to the remote unit. In some embodiments, the radio resource control release message includes a timer that indicates a time during which the remote unit cannot access the cellular network and a cause indicator that indicates a reason for the radio resource control release message. In one embodiment, in response to transmitting an indication to the base unit indicating that the remote unit is part of an unauthorized aerial vehicle, the base unit handles the remote unit based on predetermined rules.

In certain embodiments, the base unit handles the remote unit by limiting the behavior of the remote unit. In various embodiments, the base unit handles the remote unit by limiting a flying area of the remote unit. In some embodiments, the base unit handles the remote unit by blacklisting the remote unit from service after the remote unit lands in a specified area. In one embodiment, the base unit handles the remote unit by increasing a difficulty of the remote unit accessing the cellular network.

Figure 6:
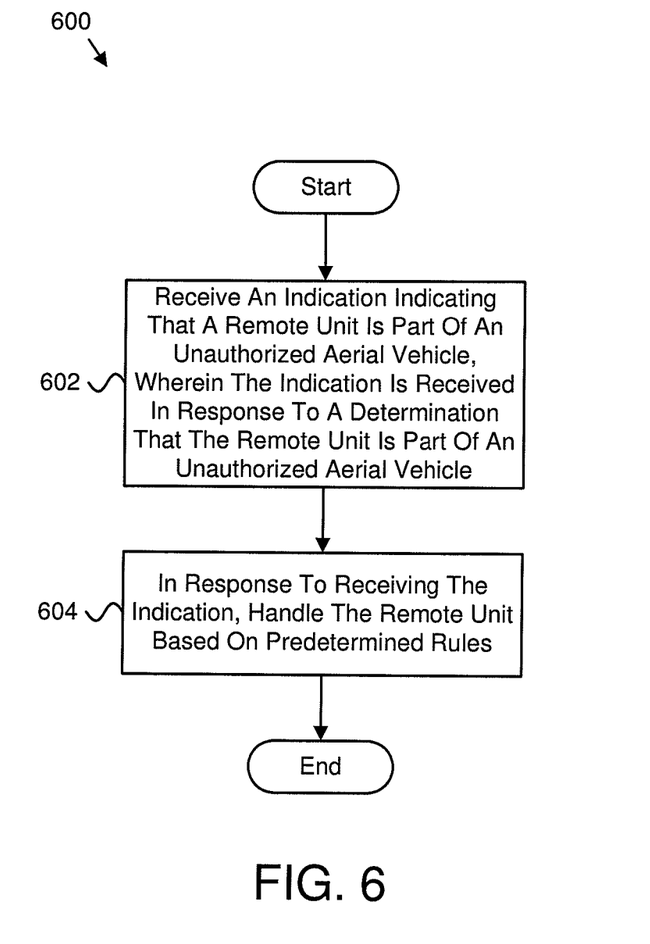
FIG. 6 is a schematic flow chart diagram illustrating another embodiment of a method for aerial vehicle identification.

FIG. 6 is a schematic flow chart diagram illustrating another embodiment of a method 600 for aerial vehicle identification. In some embodiments, the method 600 is performed by an apparatus, such as the base unit 104 (e.g., eNB). In certain embodiments, the method 600 may be performed by a processor executing program code, for example, a microcontroller, a microprocessor, a CPU, a GPU, an auxiliary processing unit, a FPGA, or the like.

The method 600 may include receiving 602 an indication indicating that a remote unit is part of an unauthorized aerial vehicle, wherein the indication is received in response to a determination that the remote unit is part of an unauthorized aerial vehicle. The method 600, in certain embodiments, includes, in response to receiving the indication, handling 604 the remote unit based on predetermined rules.

In one embodiment, the method 600 includes transmitting a request to identify whether the remote unit is part of an unauthorized aerial vehicle in response to a predetermined condition occurring. In a further embodiment, the predetermined condition includes detecting strong interference in a cellular network comprising the remote unit, the remote unit requesting access to the cellular network, or some combination thereof. In certain embodiments, the method 600 includes receiving the indication indicating that the remote unit is part of an unauthorized aerial vehicle by receiving a time period after which the remote unit will be unauthorized in the cellular network, a remote unit identification that is part of an unauthorized aerial vehicle, a list of remote unit identifications that are part of an unauthorized aerial vehicle, a remote unit type that is part of an unauthorized aerial vehicle, or some combination thereof. In various embodiments, the method 600 includes, in response to receiving an indication that the remote unit is part of an unauthorized aerial vehicle, transmitting a radio resource control release message to the remote unit. In some embodiments, the radio resource control release message includes a timer that indicates a time during which the remote unit cannot access the cellular network and a cause indicator that indicates a reason for the radio resource control release message. In one embodiment, the method 600 includes, in response to receiving an indication indicating that the remote unit is part of an unauthorized aerial vehicle, handling the remote unit based on predetermined rules.

In a further embodiment, the method 600 includes handling the remote unit by limiting the behavior of the remote unit. In certain embodiments, the method 600 includes handling the remote unit by limiting a flying area of the remote unit. In various embodiments, the method 600 includes handling the remote unit by blacklisting the remote unit from service after the remote unit lands in a specified area. In some embodiments, the method 600 includes handling the remote unit by increasing a difficulty of the remote unit accessing the cellular network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
transmitting a request for information to a remote unit, wherein the information aids in identifying an unauthorized aerial vehicle;
receiving a response to the request for information from the remote unit;
determining, based on the information, whether the remote unit is part of an unauthorized aerial vehicle; and
in response to determining that the remote unit is part of an unauthorized aerial vehicle, transmitting an indication to a base unit indicating that the remote unit is part of an unauthorized aerial vehicle, wherein transmitting the indication to the base unit indicating that the remote unit is part of the unauthorized aerial vehicle comprises transmitting a time period after which the remote unit will be unauthorized in the cellular network, a remote unit identification that is part of the unauthorized aerial vehicle, a list of remote unit identifications that are part of the unauthorized aerial vehicle, a remote unit type that is part of the unauthorized aerial vehicle, or some combination thereof.

2. The method of claim 1, wherein transmitting the request for information to the remote unit is performed in response to a message received from the remote unit, the base unit, or some combination thereof, and the message is received from the remote unit in response to the remote unit requesting access to a cellular network.

3. The method of claim 1, wherein transmitting the request for information to the remote unit is performed in response to a message received by the base unit, and the message comprises a request to identify whether the remote unit is part of an unauthorized aerial vehicle.

4. The method of claim 3, wherein the request to identify whether the remote unit is part of an unauthorized aerial vehicle comprises a remote unit identification, a list of remote unit identifications, a serving cell identification of the remote unit, a message type, or some combination thereof.

5. The method of claim 3, wherein the request to identify whether the remote unit is part of an unauthorized aerial vehicle is transmitted from the base unit in response to a predetermined condition occurring, and the predetermined condition comprises the base unit detecting strong interference in a cellular network comprising the remote unit, the remote unit requesting access to the cellular network, or some combination thereof.

6. The method of claim 1, wherein the information comprises location information, assistance information, quality of service information, or some combination thereof.

7. The method of claim 6, wherein the location information comprises a longitude, a latitude, an altitude, a velocity, a direction, an accuracy, a confidence, or some combination thereof.

8. The method of claim 6, wherein the assistance information comprises a service type, a flight path plan, a certification, an authentication, or some combination thereof.

9. The method of claim 1, wherein determining, based on the information, whether the remote unit is part of an unauthorized aerial vehicle comprises using a three dimensional geographical map to determine whether the remote unit is airborne, using certification information to determine whether a flying remote unit is authorized, or some combination thereof.

10. The method of claim 1, wherein determining, based on the information, whether the remote unit is part of an unauthorized aerial vehicle comprises:
   in response to the remote unit having no drone capability, no certification, and being in the air, determining that the remote unit is an unauthorized aerial vehicle;
   in response to the remote unit having drone capability, no certification, and being in the air, determining that the remote unit is an unauthorized aerial vehicle; and
   in response to the remote unit having drone capability, a certification, and being in the air, determining that the remote unit is an authorized aerial vehicle.

11. The method of claim 1, wherein, in response to transmitting an indication to the base unit indicating that the remote unit is part of an unauthorized aerial vehicle, the base unit sends a radio resource control release message to the remote unit, and the radio resource control release message comprises a timer that indicates a time during which the remote unit cannot access the cellular network and a cause indicator that indicates a reason for the radio resource control release message.

12. The method of claim 1, wherein, in response to transmitting an indication to the base unit indicating that the remote unit is part of an unauthorized aerial vehicle, the base unit handles the remote unit based on predetermined rules, wherein the based unit handles the remote unit by:
   limiting the behavior of the remote unit;
   limiting a flying area of the remote unit;
   blacklisting the remote unit from service after the remote unit lands in a specified area;
   increasing a difficulty of the remote unit accessing the cellular network;
   or some combination thereof.

13. An apparatus comprising:
   a transmitter that transmits a request for information to a remote unit, wherein the information aids in identifying an unauthorized aerial vehicle;
   a receiver that receives a response to the request for information from the remote unit; and
   a processor that determines, based on the information, whether the remote unit is part of an unauthorized aerial vehicle;
   wherein, in response to determining that the remote unit is part of an unauthorized aerial vehicle, the transmitter transmits an indication to a base unit indicating that the remote unit is part of an unauthorized aerial vehicle, wherein the transmitter transmitting the indication to the base unit indicating that the remote unit is part of the unauthorized aerial vehicle comprises the transmitter transmitting a time period after which the remote unit will be unauthorized in the cellular network, a remote unit identification that is part of the unauthorized aerial vehicle, a list of remote unit identifications that are part of the unauthorized aerial vehicle, a remote unit type that is part of the unauthorized aerial vehicle, or some combination thereof.

14. A method comprising:
   receiving an indication indicating that a remote unit is part of an unauthorized aerial vehicle, wherein the indication is received in response to a determination that the remote unit is part of an unauthorized aerial vehicle, wherein receiving the indication indicating that the remote unit is part of the unauthorized aerial vehicle comprises receiving a time period after which the remote unit will be unauthorized in the cellular network, a remote unit identification that is part of the unauthorized aerial vehicle, a list of remote unit identifications that are part of the unauthorized aerial vehicle, a remote unit type that is part of the unauthorized aerial vehicle, or some combination thereof; and
   in response to receiving the indication, handling the remote unit based on predetermined rules.

15. The method of claim 14, further comprising transmitting a request to identify whether the remote unit is part of an unauthorized aerial vehicle in response to a predetermined condition occurring, wherein the predetermined condition comprises detecting strong interference in a cellular network comprising the remote unit, the remote unit requesting access to the cellular network, or some combination thereof.

16. The method of claim 14, wherein, in response to receiving an indication that the remote unit is part of an unauthorized aerial vehicle, sending a radio resource control release message to the remote unit, and the radio resource control release message comprises a timer that indicates a time during which the remote unit cannot access the cellular network and a cause indicator that indicates a reason for the radio resource control release message.

17. The method of claim 14, wherein, in response to receiving an indication indicating that the remote unit is part of an unauthorized aerial vehicle, handling the remote unit based on predetermined rules, wherein handling the remote unit comprises:
   limiting the behavior of the remote unit;
   limiting a flying area of the remote unit;
   blacklisting the remote unit from service after the remote unit lands in a specified area;
   increasing a difficulty of the remote unit accessing the cellular network;
   or some combination thereof.

18. An apparatus comprising:
   a receiver that receives an indication indicating that a remote unit is part of an unauthorized aerial vehicle, wherein the indication is received in response to a determination that the remote unit is part of an unauthorized aerial vehicle, wherein the receiver receiving the indication indicating that the remote unit is part of the unauthorized aerial vehicle comprises the receiver receiving a time period after which the remote unit will be unauthorized in the cellular network, a remote unit identification that is part of the unauthorized aerial vehicle, a list of remote unit identifications that are part of the unauthorized aerial vehicle, a remote unit type that is part of the unauthorized aerial vehicle, or some combination thereof; and
   a processor that, in response to receiving the indication, handles the remote unit based on predetermined rules.

* * * * *